US011524252B2

(12) United States Patent
Aquilina et al.

(10) Patent No.: US 11,524,252 B2
(45) Date of Patent: Dec. 13, 2022

(54) FILTER FOR A FILTRATION DEVICE

(71) Applicant: ABP—Aquilina Bouvier Pool, Albon (FR)

(72) Inventors: Yann Aquilina, Roquevaire (FR); Matthieu Bouvier, Albon (FR)

(73) Assignee: ABP—Aquilina Bouvier Pool, Albon (FR)

( * ) Notice: Subject to any disclaimer, the term of this patent is extended or adjusted under 35 U.S.C. 154(b) by 0 days.

(21) Appl. No.: 16/966,860

(22) PCT Filed: Dec. 6, 2018

(86) PCT No.: PCT/FR2018/053146
§ 371 (c)(1),
(2) Date: Jul. 31, 2020

(87) PCT Pub. No.: WO2019/150006
PCT Pub. Date: Aug. 8, 2019

(65) Prior Publication Data
US 2021/0039022 A1    Feb. 11, 2021

(30) Foreign Application Priority Data
Feb. 2, 2018 (FR) ...................................... 1870118

(51) Int. Cl.
*B01D 29/23*    (2006.01)
*E04H 4/12*     (2006.01)
*C02F 103/42*   (2006.01)

(52) U.S. Cl.
CPC ........... *B01D 29/23* (2013.01); *E04H 4/1272* (2013.01); *B01D 2201/02* (2013.01); *B01D 2201/31* (2013.01); *C02F 2103/42* (2013.01)

(58) Field of Classification Search
None
See application file for complete search history.

(56) References Cited

U.S. PATENT DOCUMENTS 2,658,625 A * 11/1953 Rafferty ................. B01D 35/02
                                                    210/497.3
3,000,508 A *  9/1961 Spaulding ............. E04H 4/1272
                                                    210/477
(Continued)

FOREIGN PATENT DOCUMENTS

DE    202008017060 U1    6/2010
NL         9002451 A     6/1992
WO      2017167456 A1   10/2017

OTHER PUBLICATIONS

International Search Report for International Application No. PCT/FR2018/053146, dated Mar. 25, 2019, 6 pages (including English translation).

(Continued)

Primary Examiner — Robert J Popovics
(74) Attorney, Agent, or Firm — TraskBritt (57) ABSTRACT

A filter, for insertion into an inlet duct of a water filtration system, has an annular upper end delimiting an opening around a longitudinal axis and defining a filter diameter. A side wall extends, around the longitudinal axis, between the annular upper end and a bottom wall that extends opposite the opening. The side and/or bottom walls have orifices to allow water to flow therethrough while retaining solid elements. The sidewall wall comprises a plurality of arms that each extend between a lower edge, connected to the bottom wall, and an upper edge forming part of the annular upper end. Each arm extends along an adjustable inclination so that the filter diameter is variable according to the inclination of each arm. When the filter is inserted into the inlet duct, the inclination of the arms is adjusted so that the filter diameter is adapted to the inlet diameter.

13 Claims, 5 Drawing Sheets

(56) References Cited

U.S. PATENT DOCUMENTS

| | | | | |
|---|---|---|---|---|
| 3,306,448 A * | 2/1967 | Baker | B01D 37/04 | 137/430 |
| 3,388,804 A * | 6/1968 | Hester | A47J 31/06 | 210/477 |
| 3,513,977 A * | 5/1970 | Bellinson | B01D 35/143 | 210/94 |
| 3,567,020 A * | 3/1971 | Whitaker | E04H 4/1272 | 210/94 |
| 3,567,025 A * | 3/1971 | Gillette | C02F 1/006 | 210/540 |
| 3,616,916 A * | 11/1971 | Greene | E04H 4/1272 | 210/121 |
| 3,616,918 A * | 11/1971 | Diemond | E04H 4/1272 | 210/167.1 |
| 3,620,372 A * | 11/1971 | Ehret | E04H 4/1272 | 210/167.1 |
| 3,628,664 A * | 12/1971 | Stanwood | E04H 4/1272 | 210/167.1 |
| 3,677,408 A * | 7/1972 | Dinizo, Jr. | E04H 4/1272 | 210/167.11 |
| 3,701,427 A * | 10/1972 | Howard | E04H 4/1209 | 210/167.1 |
| 3,706,379 A * | 12/1972 | Erlich | E04H 4/1272 | 210/123 |
| 3,760,947 A * | 9/1973 | Morrison | C02F 1/763 | 261/121.1 |
| 3,765,534 A * | 10/1973 | West | E04H 4/1272 | 210/206 |
| 3,792,499 A * | 2/1974 | Whitaker | E04H 4/1272 | 4/512 |
| 3,815,161 A * | 6/1974 | Baker | E04H 4/1272 | 4/512 |
| 3,831,897 A * | 8/1974 | Stegmeier | E04H 4/1272 | 249/145 |
| 3,841,487 A * | 10/1974 | Villette | E04H 4/1272 | 210/123 |
| 3,856,679 A * | 12/1974 | Jackson | E04H 4/1272 | 210/471 |
| 3,910,840 A * | 10/1975 | Adam | E04H 4/1272 | 210/91 |
| 3,939,505 A * | 2/1976 | Gross | E04H 4/1272 | 4/512 |
| 4,022,690 A * | 5/1977 | Smith | E04H 4/1272 | 210/249 |
| 4,059,519 A * | 11/1977 | Zieg | B01D 35/02 | 210/474 |
| 4,126,925 A * | 11/1978 | Jacuzzi | E04H 4/1272 | 4/490 |
| 4,154,679 A * | 5/1979 | Farage | E04H 4/1272 | 210/407 |
| D255,480 S * | 6/1980 | Zieg | D23/209 | |
| 4,207,809 A * | 6/1980 | Brill | A47J 31/06 | 99/279 |
| 4,212,740 A * | 7/1980 | Greene | E04H 4/1272 | 210/242.1 |
| 4,253,959 A * | 3/1981 | Tafara | B01D 29/27 | 210/232 |
| 4,325,150 A * | 4/1982 | Buddy | E04H 4/1272 | D23/209 |
| 4,325,462 A * | 4/1982 | Gouzos | E04H 4/1272 | 4/488 |
| 4,348,281 A * | 9/1982 | Perry | E04H 4/1272 | 210/163 |
| 4,426,286 A * | 1/1984 | Puckett | E04H 4/1272 | 210/121 |
| 4,454,035 A * | 6/1984 | Stefan | E04H 4/1272 | 210/123 |
| 4,501,659 A * | 2/1985 | Henk | E04H 4/1272 | 417/90 |
| 4,512,955 A * | 4/1985 | Etani | B01F 21/22 | 137/268 |
| 4,519,914 A * | 5/1985 | Etani | B05B 7/04 | 210/764 |
| 4,530,120 A * | 7/1985 | Etani | B01F 21/22 | 210/765 |
| 4,637,873 A * | 1/1987 | DeSousa | E04H 4/1272 | 210/232 |
| 4,707,253 A * | 11/1987 | Rowe | E04H 4/1272 | 210/232 |
| 4,725,352 A * | 2/1988 | Haliotis | E04H 4/1272 | 137/625.3 |
| 4,737,279 A * | 4/1988 | Lewis | E04H 4/1272 | 134/167 R |
| 4,740,307 A * | 4/1988 | Buelteman | E04H 4/1645 | 210/232 |
| 4,743,368 A * | 5/1988 | Gates | E04H 4/1272 | 210/136 |
| 4,776,908 A * | 10/1988 | Sapp | E04H 4/1272 | 156/330 |
| 4,776,953 A * | 10/1988 | Frentzel | E04H 4/1272 | 134/167 R |
| 4,798,670 A * | 1/1989 | Treene | E04H 4/1272 | 210/416.2 |
| 4,818,389 A * | 4/1989 | Tobias | E04H 4/1272 | 417/186 |
| 4,826,591 A * | 5/1989 | Macia | E04H 4/1272 | 4/512 |
| 4,876,001 A * | 10/1989 | Supra | E04H 4/1272 | 137/433 |
| 4,879,772 A * | 11/1989 | Meloney, Jr. | E04H 4/1272 | 210/167.1 |
| 4,913,810 A * | 4/1990 | Hodak | E04H 4/1272 | 4/496 |
| 4,921,606 A * | 5/1990 | Goldman | B01D 29/27 | 55/378 |
| 4,959,146 A * | 9/1990 | Kristan | B01D 29/33 | 376/310 |
| 4,988,437 A * | 1/1991 | Gefter | B01D 29/58 | 210/453 |
| 5,100,541 A * | 3/1992 | Kallenbach | B01D 29/96 | 210/450 |
| 5,124,032 A * | 6/1992 | Newhard | C02F 1/688 | 210/206 |
| 5,176,830 A * | 1/1993 | Wiggins | A47J 31/06 | 210/477 |
| 5,181,283 A * | 1/1993 | Gillebaard | E04H 4/1272 | 4/496 |
| 5,202,020 A * | 4/1993 | Desjoyaux | B01D 29/35 | 4/490 |
| 5,234,588 A * | 8/1993 | Aymes | B01F 21/22 | 210/206 |
| 5,285,538 A * | 2/1994 | Hodak | E04H 4/1272 | 220/241 |
| 5,290,444 A * | 3/1994 | Campbell | A47J 31/06 | 210/473 |
| 5,338,446 A * | 8/1994 | Schuman | E04H 4/1645 | 210/453 |
| 5,417,855 A * | 5/1995 | Gershenson | B01D 29/58 | 210/441 |
| 5,554,277 A * | 9/1996 | Rief | E04H 4/1272 | 210/232 |
| 5,581,826 A * | 12/1996 | Edwards | E04H 4/1645 | 4/507 |
| 5,604,939 A * | 2/1997 | Widener | E04H 4/1272 | 4/496 |
| 5,605,622 A * | 2/1997 | Ferraro | E04H 4/1654 | 210/420 |
| 5,672,271 A * | 9/1997 | Dye | E04H 4/1272 | 210/405 |
| 5,750,022 A * | 5/1998 | Blake | E04H 4/1636 | 210/406 |
| 5,753,112 A * | 5/1998 | Barnes | E04H 4/1272 | 4/507 |
| 5,755,962 A * | 5/1998 | Gershenson | B01D 63/00 | 210/497.1 |
| 5,785,846 A * | 7/1998 | Barnes | E04H 4/1272 | 4/490 |

(56) References Cited

U.S. PATENT DOCUMENTS

| | | | | |
|---|---|---|---|---|
| 5,810,999 A * | 9/1998 | Bachand | B01F 21/22 | 210/206 |
| 5,830,350 A * | 11/1998 | Voss | E04H 4/1272 | 4/290 |
| 5,862,541 A * | 1/1999 | Mailhot | A01K 29/00 | 119/221 |
| 5,888,386 A * | 3/1999 | Enright | C02F 1/688 | 210/232 |
| 5,935,450 A * | 8/1999 | Benedict | E04H 4/1272 | 210/776 |
| 5,989,421 A * | 11/1999 | Davis | B01D 29/96 | 210/477 |
| 6,007,714 A * | 12/1999 | Keith | E04H 4/1272 | 210/474 |
| 6,022,481 A * | 2/2000 | Blake | E04H 4/1645 | 210/776 |
| 6,071,403 A * | 6/2000 | Usher | E04H 4/1272 | 4/496 |
| RE36,913 E * | 10/2000 | Ferraro | E04H 4/1645 | 210/420 |
| 6,180,017 B1 * | 1/2001 | Usher | B01D 35/02 | 210/791 |
| 6,387,261 B1 * | 5/2002 | Mojena | B01D 24/042 | 210/488 |
| 6,393,628 B1 * | 5/2002 | Kellogg | F16K 1/2021 | 4/496 |
| 6,406,621 B1 * | 6/2002 | Bates | E02B 15/106 | 210/242.1 |
| 6,471,856 B1 * | 10/2002 | Keith | B01D 29/21 | 210/489 |
| 6,481,340 B2 * | 11/2002 | Pope | A47J 31/0631 | 99/295 |
| 6,487,961 B2 * | 12/2002 | Bunn | A47J 31/0631 | 99/323 |
| 6,572,765 B2 * | 6/2003 | Lincke | E04H 4/1272 | 210/232 |
| 6,592,756 B1 * | 7/2003 | Felix, Jr. | E04H 4/14 | 210/477 |
| 6,685,843 B2 * | 2/2004 | Leaverton | B01D 29/27 | 210/485 |
| 6,701,542 B2 * | 3/2004 | Marbach | E04H 4/1272 | 4/490 |
| 6,706,174 B1 * | 3/2004 | Keith | B01D 29/01 | 210/489 |
| 6,716,342 B1 * | 4/2004 | Tilsner | E04H 4/1272 | 210/232 |
| 6,770,193 B2 * | 8/2004 | Foley | E04H 4/1272 | 4/496 |
| 6,797,164 B2 * | 9/2004 | Leaverton | B01D 29/27 | 210/485 |
| 6,805,042 B2 * | 10/2004 | Mordini | A47J 31/0642 | 99/295 |
| 6,830,680 B2 * | 12/2004 | Queirel | E04H 4/1272 | 137/602 |
| 6,878,266 B2 * | 4/2005 | Leaverton | C02F 1/004 | 220/495.11 |
| 6,893,557 B2 * | 5/2005 | Harris-Griffin | E04H 4/1272 | 210/416.2 |
| 6,932,899 B2 * | 8/2005 | Bonelli | B01D 29/35 | 210/85 |
| 6,939,463 B2 * | 9/2005 | Leaverton | C02F 1/004 | 220/495.11 |
| 6,962,655 B1 * | 11/2005 | Gjerstad | B01D 29/23 | 210/416.2 |
| 6,966,079 B2 * | 11/2005 | Stetson | E04H 4/1272 | 4/512 |
| 7,011,747 B2 * | 3/2006 | Hodak | E04H 4/1272 | 210/232 |
| 7,052,612 B2 * | 5/2006 | Kelty | E04H 4/1272 | 210/776 |
| 7,076,813 B2 * | 7/2006 | Stetson | E04H 4/1272 | 4/512 |
| 7,144,515 B2 * | 12/2006 | Brosemer | E04H 4/1272 | 210/512.1 |
| D550,805 S * | 9/2007 | Hazlehurst | D23/209 | |
| 7,300,576 B1 * | 11/2007 | Blake | E04H 4/1272 | 4/507 |
| D557,374 S * | 12/2007 | Pecca | D23/209 | |
| 7,309,443 B2 * | 12/2007 | Kelty | C02F 1/325 | 210/776 |
| 7,311,821 B2 * | 12/2007 | Queirel | E04H 4/1272 | 210/232 |
| 7,314,553 B1 * | 1/2008 | Barbe | B01D 29/27 | 210/232 |
| 7,384,544 B2 * | 6/2008 | Meincke | C02F 1/001 | 4/507 |
| 7,390,401 B2 * | 6/2008 | Hodak | E04H 4/1272 | 210/232 |
| 7,451,500 B2 * | 11/2008 | Baker, Jr. | E04H 4/1272 | 4/496 |
| 7,531,092 B2 * | 5/2009 | Hazlehurst | B01D 35/26 | 415/121.2 |
| 7,550,078 B2 * | 6/2009 | Meagher | E04H 4/1272 | 4/496 |
| 7,553,425 B2 * | 6/2009 | Stern | E04H 4/1218 | 210/791 |
| 7,563,365 B2 * | 7/2009 | Pellington | E04H 4/1272 | 4/507 |
| 7,699,983 B2 * | 4/2010 | Andrei | E04H 4/1272 | 210/232 |
| 7,727,387 B2 * | 6/2010 | Goggin | E04H 4/1272 | 210/136 |
| 7,815,795 B2 * | 10/2010 | Parks | E04H 4/1272 | 210/232 |
| 7,815,797 B1 * | 10/2010 | Keith | E04H 4/1272 | 210/477 |
| 7,862,712 B2 * | 1/2011 | Tak | E04H 4/1663 | 210/167.13 |
| 7,993,515 B2 * | 8/2011 | Davies | E04H 4/1272 | 210/167.2 |
| 8,011,032 B2 * | 9/2011 | Cline | E04H 4/129 | 4/512 |
| 8,042,849 B2 * | 10/2011 | Pratt | B66F 15/00 | 294/19.3 |
| 8,091,934 B2 * | 1/2012 | Bair | E04H 4/1272 | 294/24 |
| 8,186,517 B2 * | 5/2012 | Bowman | F04D 29/605 | 415/121.2 |
| 8,216,464 B2 * | 7/2012 | Brewington | A47J 31/446 | 210/474 |
| 8,496,813 B2 * | 7/2013 | Couturier | E04H 4/1272 | 210/167.19 |
| 8,555,989 B1 * | 10/2013 | Agajanian | E04H 4/1272 | 169/5 |
| D694,851 S * | 12/2013 | Solakian | D23/209 | |
| 8,636,899 B2 * | 1/2014 | Tesauro | E04H 4/14 | 4/290 |
| 8,647,504 B2 * | 2/2014 | Vogtner | E04H 4/1272 | 210/470 |
| 8,721,881 B1 * | 5/2014 | Smith | C02F 1/001 | 210/232 |
| 8,820,355 B2 * | 9/2014 | Sutton | F16K 31/52483 | 137/119.07 |
| 8,864,986 B1 * | 10/2014 | Smith | E04H 4/1272 | 210/232 |
| 8,888,999 B2 * | 11/2014 | Van der Meijden | B04C 5/04 | 210/512.1 |
| 9,079,128 B2 * | 7/2015 | Parcell | B01D 29/35 | |
| 9,108,794 B2 * | 8/2015 | Fu | B65D 85/8061 | |
| 9,194,148 B1 * | 11/2015 | Koller | E04H 4/06 | |
| 9,260,877 B2 * | 2/2016 | Lopez | E04H 4/1209 | |
| 9,260,878 B2 * | 2/2016 | Zars | B01D 29/23 | |
| 9,284,742 B1 * | 3/2016 | Deckard | E04H 4/105 | |
| 9,309,685 B1 * | 4/2016 | Hull | B25J 1/04 | |
| 9,347,234 B2 * | 5/2016 | Voss Weyman | E04H 4/1272 | |
| 9,366,047 B2 * | 6/2016 | Pettit | E04H 4/1218 | |
| 9,428,929 B2 * | 8/2016 | Prendergast | E04H 4/1272 | |
| 9,447,595 B1 * | 9/2016 | Goettl | E04H 4/1272 | |

(56) References Cited

U.S. PATENT DOCUMENTS

| | | | |
|---|---|---|---|
| 9,452,879 B2* | 9/2016 | Fu | A47J 31/08 |
| 9,453,354 B1 | 9/2016 | Goettl | E04H 4/1272 |
| 9,581,478 B1* | 2/2017 | Smith | E04H 4/1272 |
| 9,593,500 B1* | 3/2017 | Goettl | E04H 4/1272 |
| 9,675,913 B1* | 6/2017 | Sebor | B01D 35/02 |
| 9,761,990 B2* | 9/2017 | Koller | H01R 13/648 |
| 9,822,540 B2* | 11/2017 | Baab | E04H 4/1272 |
| 9,874,037 B1* | 1/2018 | Goettl | E04H 4/1272 |
| 9,896,855 B2* | 2/2018 | Angelino | E04H 4/1272 |
| 9,932,747 B2* | 4/2018 | Greenwald | E04H 4/1272 |
| 9,945,141 B2* | 4/2018 | Goettl | C02F 1/001 |
| 9,999,848 B2* | 6/2018 | Morgan, III | B01D 29/27 |
| 9,999,849 B2* | 6/2018 | Morgan, III | B01D 29/27 |
| 10,036,174 B2* | 7/2018 | Smith | E04H 4/1263 |
| 10,132,096 B2* | 11/2018 | Smith | E04H 4/1272 |
| 10,138,644 B1* | 11/2018 | Piepenburg | E04H 4/141 |
| 10,161,151 B2* | 12/2018 | Goettl | E04H 4/1272 |
| 10,167,648 B1* | 1/2019 | Nelson | E04H 4/1272 |
| 10,214,931 B2* | 2/2019 | Saccoccio | B01D 29/31 |
| 10,378,228 B2* | 8/2019 | Huang | B01D 35/301 |
| 10,399,016 B2* | 9/2019 | Angelino | E04H 4/1272 |
| 10,435,901 B1* | 10/2019 | Smith-Taylor | C02F 1/76 |
| 10,443,257 B2* | 10/2019 | Greenwald | E04H 4/1272 |
| 10,526,808 B2* | 1/2020 | Smith | C02F 1/001 |
| 10,631,680 B2* | 4/2020 | Johnson | A47J 31/4403 |
| 10,662,666 B2* | 5/2020 | Jackson | C02F 1/40 |
| 10,722,827 B1* | 7/2020 | Hetzner | E04H 4/1209 |
| 10,731,367 B1* | 8/2020 | Willwater | E04H 4/1272 |
| 10,816,528 B2* | 10/2020 | Yizhack | G01N 33/18 |
| 10,835,846 B1* | 11/2020 | Carpenter | B25J 1/04 |
| 10,837,189 B2* | 11/2020 | Vogtner | E04H 4/1272 |
| 10,851,555 B1* | 12/2020 | Willwater | E04H 4/1272 |
| 10,876,311 B1* | 12/2020 | Schmidt | E04H 4/1272 |
| 10,876,312 B1* | 12/2020 | Schmidt | E04H 4/1272 |
| 10,876,313 B1* | 12/2020 | Schmidt | E04H 4/1272 |
| 10,890,005 B2* | 1/2021 | Ramos | E04H 4/1272 |
| 10,920,439 B2* | 2/2021 | Jackson | E04H 4/1272 |
| 10,961,737 B2* | 3/2021 | Jackson | E04H 4/1272 |
| 11,072,935 B1* | 7/2021 | Yu | E04H 4/1272 |
| 11,103,813 B2* | 8/2021 | Lopez | B01D 29/96 |
| D935,573 S * | 11/2021 | Cohen | D23/261 |
| D936,188 S * | 11/2021 | Cohen | D23/261 |
| 11,193,504 B1* | 12/2021 | Mjelde | F04D 29/026 |
| 11,248,385 B2* | 2/2022 | Willwater | E04H 4/1272 |
| 11,266,929 B2* | 3/2022 | Hetzner | B01D 35/30 |
| 11,332,950 B2* | 5/2022 | Schmidt | E04H 4/1263 |
| 2002/0117432 A1* | 8/2002 | Lincke | B01D 29/27 210/167.12 |
| 2003/0094423 A1* | 5/2003 | Leaverton | B01D 29/27 210/167.12 |
| 2003/0141232 A1* | 7/2003 | Queirel | E04H 4/1272 210/416.2 |
| 2003/0205537 A1* | 11/2003 | Leaverton | C02F 1/004 210/767 |
| 2003/0213743 A1 | 11/2003 | Gurarslan | |
| 2004/0031738 A1* | 2/2004 | Harris-Griffin | E04H 4/1272 210/416.2 |
| 2004/0045895 A1* | 3/2004 | Bonelli | B01D 29/23 210/497.1 |
| 2004/0074831 A1* | 4/2004 | Mhoon | E04H 4/1272 210/167.19 |
| 2004/0104163 A1* | 6/2004 | Leaverton | C02F 1/00 210/237 |
| 2004/0149666 A1* | 8/2004 | Leaverton | C02F 1/00 210/416.2 |
| 2004/0182766 A1* | 9/2004 | Kelty | E04H 4/1272 210/167.12 |
| 2004/0205886 A1* | 10/2004 | Goettl | E04H 4/1272 4/507 |
| 2005/0000012 A1* | 1/2005 | Stetson | E04H 4/1272 4/508 |
| 2005/0087482 A1* | 4/2005 | Hodak | E04H 4/1272 4/490 |
| 2005/0097665 A1* | 5/2005 | Goettl | E04H 4/1236 4/507 |
| 2005/0235408 A1* | 10/2005 | Stetson | E04H 4/1272 210/538 |
| 2006/0070935 A1* | 4/2006 | Brosemer | E04H 4/1272 4/490 |
| 2006/0101571 A1* | 5/2006 | Goettl | E04H 4/1272 4/507 |
| 2006/0107453 A1* | 5/2006 | Goettl | E04H 4/1272 4/507 |
| 2006/0124521 A1* | 6/2006 | Hodak | E04H 4/1272 4/490 |
| 2006/0163132 A1* | 7/2006 | Kelty | E04H 4/1272 210/776 |
| 2006/0242757 A1* | 11/2006 | Goettl | E04H 4/1272 4/507 |
| 2006/0260035 A1* | 11/2006 | Baker, Jr. | E04H 4/1272 4/507 |
| 2006/0289344 A1* | 12/2006 | Queirel | E04H 4/1272 210/167.1 |
| 2007/0039859 A1* | 2/2007 | King | E04H 4/1281 210/97 |
| 2007/0045163 A1* | 3/2007 | Meincke | C02F 1/004 210/167.1 |
| 2007/0095214 A1* | 5/2007 | Finney | A47J 31/08 99/323 |
| 2007/0163933 A1* | 7/2007 | Goggin | E04H 4/1272 210/167.13 |
| 2008/0073257 A1* | 3/2008 | Foley | E04H 4/1272 210/167.13 |
| 2008/0098507 A1* | 5/2008 | Pellington | E04H 4/1272 4/507 |
| 2008/0099386 A1* | 5/2008 | Pellington | E04H 4/1272 4/490 |
| 2008/0099387 A1* | 5/2008 | Pellington | E04H 4/1272 210/167.1 |
| 2008/0216877 A1* | 9/2008 | Lawson | E04H 4/0025 4/490 |
| 2008/0272039 A1* | 11/2008 | Tak | E04H 4/1272 210/167.13 |
| 2009/0120856 A1* | 5/2009 | Meagher | A01K 29/00 4/507 |
| 2009/0120857 A1* | 5/2009 | Bair | E04H 4/14 210/167.1 |
| 2009/0145498 A1* | 6/2009 | Bowman | F04D 29/426 137/550 |
| 2009/0159516 A1* | 6/2009 | Andrei | E04H 4/1272 210/167.12 |
| 2009/0243318 A1* | 10/2009 | Pratt | B65G 7/12 294/209 |
| 2010/0051531 A1* | 3/2010 | Brewington | A47J 31/08 210/235 |
| 2010/0084325 A1* | 4/2010 | Parks | E04H 4/1272 210/167.12 |
| 2010/0125942 A1* | 5/2010 | Nelson | E04H 4/1281 4/490 |
| 2010/0230336 A1* | 9/2010 | Davies | E04H 4/1263 210/167.2 |
| 2010/0314328 A1* | 12/2010 | Bizon | E03D 1/30 210/744 |
| 2012/0006730 A1* | 1/2012 | Tesauro | E04H 4/1272 210/87 |
| 2012/0097589 A1* | 4/2012 | Van Der Meijden | B04C 5/04 210/167.1 |
| 2012/0248045 A1* | 10/2012 | Prendergast | E04H 4/1272 210/776 |
| 2012/0305462 A1* | 12/2012 | Vogtner | E04H 4/1272 210/167.12 |
| 2012/0305498 A1* | 12/2012 | Palmer | E04H 4/1272 210/776 |
| 2013/0146525 A1* | 6/2013 | Parcell | B01D 29/35 210/348 |
| 2014/0076814 A1* | 3/2014 | Monzingo | E04H 4/1209 210/663 |
| 2014/0209546 A1* | 7/2014 | Smith | E04H 4/1272 210/776 |

(56) References Cited

U.S. PATENT DOCUMENTS

| | | | | |
|---|---|---|---|---|
| 2014/0263101 A1* | 9/2014 | Voss Weyman | ...... | E04H 4/1272 210/776 |
| 2015/0068961 A1* | 3/2015 | Zars | ...... | E04H 4/1272 210/167.11 |
| 2015/0136678 A1* | 5/2015 | Lopez | ...... | B01D 29/00 210/232 |
| 2015/0354241 A1* | 12/2015 | Pettit | ...... | B01D 29/35 210/791 |
| 2015/0354242 A1* | 12/2015 | Saccoccio | ...... | B01D 29/50 210/806 |
| 2016/0010353 A1* | 1/2016 | Giroux | ...... | B01D 29/23 4/494 |
| 2016/0028183 A1* | 1/2016 | Koller | ...... | E04H 4/1209 439/283 |
| 2016/0222687 A1* | 8/2016 | Smith | ...... | B01D 29/35 |
| 2016/0230407 A1 | 8/2016 | Voss Weyman | ...... | E04H 4/1272 |
| 2016/0251866 A1* | 9/2016 | Greenwald | ...... | E04H 4/1272 210/167.19 |
| 2016/0289986 A1* | 10/2016 | Baab | ...... | E04H 4/1272 |
| 2016/0305143 A1* | 10/2016 | Hatlen | ...... | E04H 4/1272 |
| 2016/0326762 A1* | 11/2016 | Goettl | ...... | E04H 4/1272 |
| 2017/0030099 A1* | 2/2017 | Vogtner | ...... | E04H 4/1272 |
| 2017/0044785 A1* | 2/2017 | Angelino | ...... | E04H 4/1272 |
| 2017/0101796 A1* | 4/2017 | Goettl | ...... | E04H 4/1272 |
| 2017/0175410 A1* | 6/2017 | Smith | ...... | E04H 4/1272 |
| 2017/0350149 A1* | 12/2017 | Smith | ...... | B01D 29/35 |
| 2018/0142484 A9* | 5/2018 | Smith | ...... | E04H 4/1263 |
| 2018/0147507 A1* | 5/2018 | Angelino | ...... | B01D 29/11 |
| 2018/0179771 A1* | 6/2018 | Greenwald | ...... | E04H 4/1272 |
| 2018/0222770 A1* | 8/2018 | Poirier | ...... | C02F 1/004 |
| 2018/0223554 A1* | 8/2018 | Amico | ...... | E04H 4/16 |
| 2018/0251993 A1* | 9/2018 | Irvine | ...... | B65G 15/60 |
| 2018/0283027 A1* | 10/2018 | Huang | ...... | B01D 35/05 |
| 2018/0328058 A1* | 11/2018 | Smith | ...... | E04H 4/1272 |
| 2019/0085578 A1* | 3/2019 | Smith | ...... | B01D 29/35 |
| 2019/0262748 A1* | 8/2019 | McKain | ...... | F16L 55/24 |
| 2019/0284826 A1* | 9/2019 | Gu | ...... | E04H 4/1209 |
| 2019/0360227 A1* | 11/2019 | Jackson | ...... | C02F 1/40 |
| 2020/0141146 A1* | 5/2020 | Smith | ...... | E04H 4/1272 |
| 2020/0197838 A1* | 6/2020 | Lopez | ...... | E04H 4/14 |
| 2020/0240163 A1* | 7/2020 | Cabrera | ...... | E04H 4/14 |
| 2020/0284059 A1* | 9/2020 | Jackson | ...... | E04H 4/1272 |
| 2020/0308856 A1* | 10/2020 | Ramos | ...... | E04H 4/1272 |
| 2020/0347629 A1* | 11/2020 | Jackson | ...... | C02F 1/40 |
| 2020/0353384 A1* | 11/2020 | Hetzner | ...... | B01D 29/35 |
| 2020/0370320 A1* | 11/2020 | Willwater | ...... | E04H 4/1272 |
| 2020/0392749 A1* | 12/2020 | Schmidt | ...... | E04H 4/1272 |
| 2020/0392750 A1* | 12/2020 | Schmidt | ...... | E04H 4/1272 |
| 2020/0392751 A1* | 12/2020 | Schmidt | ...... | E04H 4/1272 |
| 2021/0010989 A1* | 1/2021 | Yizhack | ...... | G01N 21/00 |
| 2021/0039022 A1* | 2/2021 | Aquilina | ...... | B01D 29/23 |
| 2021/0062527 A1* | 3/2021 | Schmidt | ...... | E04H 4/1263 |
| 2021/0095489 A1* | 4/2021 | Willwater | ...... | E04H 4/1272 |
| 2021/0172188 A1* | 6/2021 | Afshar | ...... | B01D 29/58 |
| 2021/0189753 A1* | 6/2021 | Schmidt | ...... | E04H 4/1272 |
| 2021/0283534 A1* | 9/2021 | Renken | ...... | B01D 29/35 |
| 2021/0332601 A1* | 10/2021 | Lopez | ...... | B01D 29/94 |
| 2022/0025668 A1* | 1/2022 | Schmidt | ...... | E04H 4/1272 |
| 2022/0049515 A1* | 2/2022 | Barnes | ...... | E04H 4/1272 |
| 2022/0055922 A1* | 2/2022 | Mendez | ...... | C02F 1/281 |
| 2022/0119291 A1* | 4/2022 | Murphy | ...... | C02F 1/76 |

OTHER PUBLICATIONS

International Written Opinion for International Application No. PCT/FR2018/053146, dated Mar. 25, 2019, 6 pages (including English machine translation).

* cited by examiner

FILTER FOR A FILTRATION DEVICE

CROSS-REFERENCE TO RELATED APPLICATIONS

This application is a national phase entry under 35 U.S.C. § 371 of International Patent Application PCT/FR2018/053146, filed Dec. 6, 2018, designating the United States of America and published as International Patent Publication WO 2019/150006 A1 on Aug. 8, 2019, which claims the benefit under Article 8 of the Patent Cooperation Treaty to French Patent Application Serial No. 1870118, filed Feb. 2, 2018.

TECHNICAL FIELD

The present disclosure relates to a filter intended to be disposed in a water filtration device, for example in a swimming pool skimmer.

BACKGROUND

Filtration devices for pool skimmers generally have a first filtration stage with an inlet filter acting as a pre-filter. Currently each skimmer model has its own inlet filter model. Each skimmer manufacturer has several different skimmer models. Skimmers have an inlet duct, the geometry of which varies according to the model, especially the diameter and height. The total number of inlet filter models is nowadays high, which makes it difficult to replace filters on older models. Indeed, the professional sellers of swimming pool equipment cannot have all the references suitable for the different skimmer models. This leads to long lead times and high replacement costs.

However, an input filter is necessary for a skimmer to function properly. Indeed, the filter makes it possible to retain plants, insects or other solid elements. Without an inlet filter, these elements penetrate into the skimmer, hindering its operation.

The inventors have designed a filter that can be used as an input filter, adapting to different models of skimmers. The disclosed embodiments make it possible to obtain the filter, and to use it on inlet ducts of different dimensions, in particular of different diameters.

BRIEF SUMMARY

A first object of the present disclosure is a filter, intended to be inserted in a water filtration system, the filtration system having an inlet duct extending around an inlet axis, according to an inlet diameter, the inlet duct being configured to collect the water to be filtered, the filter extending around a longitudinal axis, and comprising:
- an annular upper end, defining an opening around the longitudinal axis, to allow water to enter the filter, the upper end defining a diameter;
- a bottom wall, forming a bottom of the filter, extending opposite the opening; and
- a side wall, extending between the upper end and the bottom wall, around the longitudinal axis,
- the side wall and/or the bottom wall having orifices, so as to allow a flow of water through the orifices and to retain solid elements, the size of which is greater than a filtration size, defined by the orifices;
the filter being characterized in that the side wall comprises:
- a plurality of arms, each arm extending between a lower edge connected to the bottom wall, and an upper edge, the upper edge forming part of the annular upper end; each arm extending from the bottom wall to the upper end away from the longitudinal axis at an inclination, the inclination between each arm and the longitudinal axis being adjustable so that the diameter of the upper end is variable according to the inclination of each arm; and
- a complementary wall, extending between each arm;

so that when the filter is inserted into the inlet duct with the longitudinal axis parallel to the inlet axis, the inclination of the arms is adjusted, in particular reduced, so that the diameter of the upper end is adapted to the inlet diameter.

The filter can have one of the following features, taken alone or in combination:
- Each arm is such that, in the absence of stress on one arm, it tends to extend, with respect to the longitudinal axis, at an angle of inclination, known as the angle of inclination at rest. The angle of inclination at rest is preferably between 20 and 60°.
- The bottom wall has a smaller diameter than the diameter of the opening.
- The complementary wall consists of elementary sections, each elementary section extending between two adjacent arms and being connected to them.
- At least one elementary section has orifices so as to allow water to flow through them.
- At least two arms are connected to an adjustment means, to move the arms towards or away from the longitudinal axis.
- The means of adjustment may include a wire, the actuation of which allows the arms to be moved towards or away from the longitudinal axis.
- The complementary wall is formed by a filtering membrane, extending between each arm, the filtering membrane being able to rest on the arms. The filter membrane can be flexible. It can be removable.
- Two arms may have a groove at their upper edge, configured so that the wire can slide into the groove. The groove may extend around the periphery of the ring end. If the inside of the filter is bounded by the side wall and the bottom wall, the groove may extend to the outside of the filter.
- The filter has at least one leg, connected to the bottom wall, the bottom wall extending between the leg and each arm, the leg being configured to rest inside the inlet duct.

A second object of the present disclosure is a method of inserting a filter, according to the first object of the present disclosure, into an inlet duct of a filtration system, the inlet duct extending around an inlet axis, according to an inlet diameter, the method comprising:
- adjustment of the filter diameter by bringing the filter arms closer to the longitudinal axis of the filter so that the diameter at the upper end is smaller than the inlet diameter;
- an insertion of the filter into the inlet duct, the longitudinal axis of the filter being coincident with the inlet axis, the insertion being such that the bottom wall of the filter is arranged at a lower level, relative to the vertical, than the upper end; and
- after insertion, the arms are released so that the arms tend to move away from the longitudinal axis and come to rest against the inlet duct.
- Adjustment is made prior to insertion.

The duct may have a shoulder, corresponding to a reduction in the inlet diameter. The filter can then rest on the shoulder.

Other advantages and features will be more clearly apparent from the description that follows of particular embodiments of the present disclosure, given as non-exhaustive examples, and represented in the figures listed below.

DETAILED DESCRIPTION

Figure 1A:
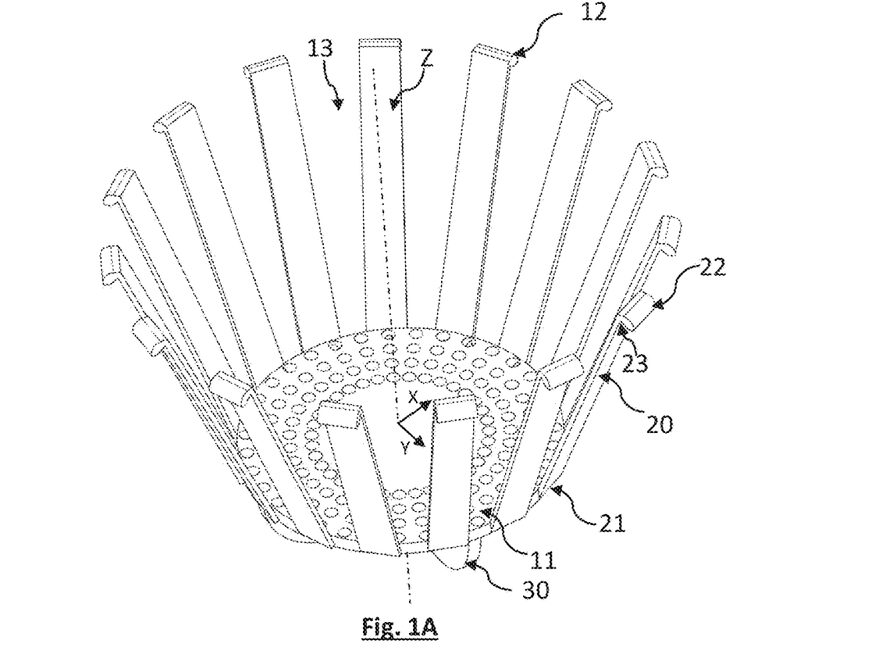
FIGS. 1A, 1B and 1C represent a first embodiment of the present disclosure.
Figure 1B:
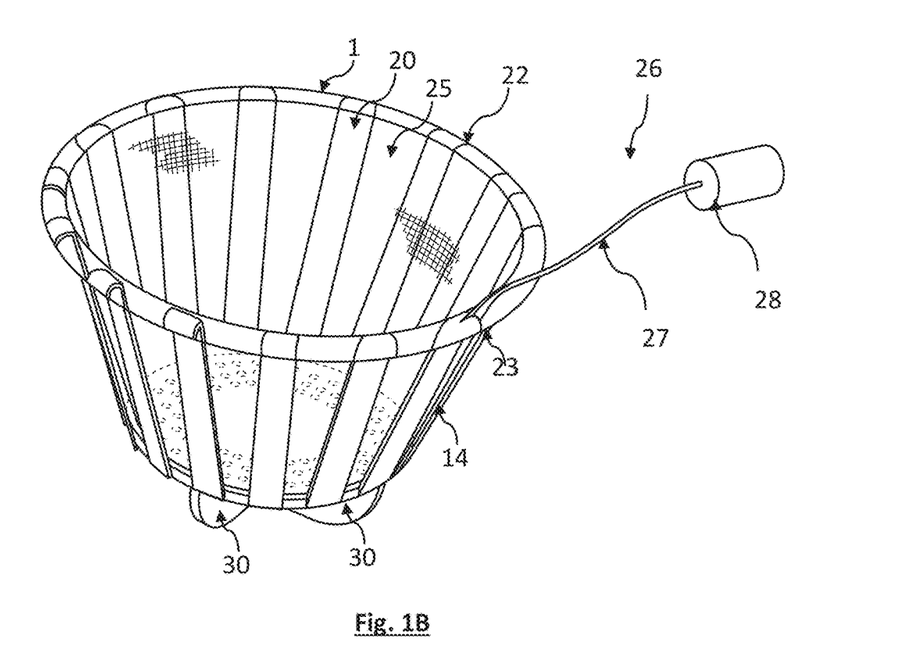
Figure 1C:
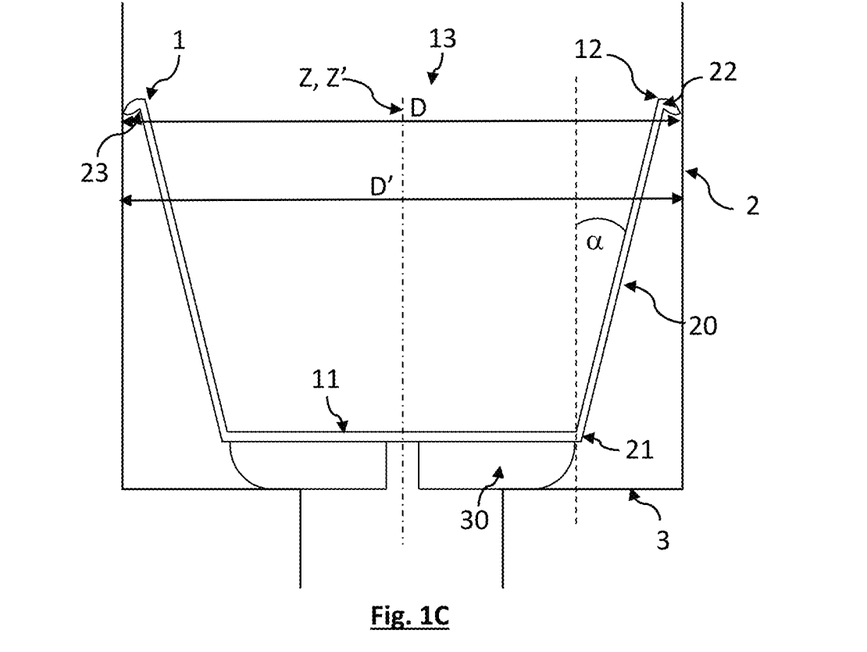

A first embodiment of a filter 1 according to the present disclosure is shown in FIGS. 1A to 1C. It is intended to be introduced into an inlet duct 2 of a filtration module or skimmer. According to this embodiment, the filter 1 comprises a body represented in FIG. 1A. The body of the filter 1 has a bottom wall 11, forming a filter bottom. The bottom wall 11 extends around a longitudinal axis Z.

In this example, the bottom wall 11 extends in a radial plane XY, perpendicular to the longitudinal axis Z. The bottom wall 11 is preferably parallel or substantially parallel to the radial plane XY. Substantially parallel means parallel within an angular tolerance of +/−30°. Preferably the bottom wall 11 is symmetrical with respect to the longitudinal axis Z. The bottom wall 11 may be solid or have orifices, the latter being intended to collect solid elements that it is desired to retain in the filter 1. The solid elements may be, in particular, plants, insects, stones or other solid elements that are to be retained. The size of the orifices determines the filtration size, i.e., the minimum size of the elements to be retained. For example, the orifices may have a diameter, or a larger diagonal, ranging from a few μm, e.g., 10 μm, to 1 cm or 2 cm.

The bottom wall 11 can be flat or have a truncated cone section.

The filter body also comprises arms 20, connected to the bottom wall 11 and extending to an upper end 12, which is annular in shape. The upper end 12 extends around the longitudinal axis Z. Each arm 20 is connected to the bottom wall 11 by a lower edge 21. Each arm 20 extends between the lower edge 21 and an upper edge 22. The upper edges 22 of each arm 20 form part of the upper end 12 of the filter 1. The upper end 12 delimits an opening 13, through which the water to be filtered enters the filter 1. The upper end 12 can have a circular or polygonal shape.

The arms 20 form part of a side wall 14 of the filter 1. The side wall 14 is an annular wall, extending transversely to the bottom wall 11, around the longitudinal axis Z. The space bounded by side wall 14, bottom wall 11 and the upper end 12 corresponds to the interior of the filter 1.

The bottom wall 11 defines a diameter, less than or equal to the diameter of the upper end 12.

In the example described in connection with FIGS. 1A to 1C, the arms 20 are made of solid material. This may be plastic or light metal. The use of plastic reduces the manufacturing cost.

In this example, the upper edge 22 of each arm 20 forms a bend, facing outward from the filter 1, to provide a peripheral groove 23 extending around each arm 20.

A filter membrane 25 can be held by the arms 20, as shown in FIG. 1B. In this figure, the filter membrane 25 is placed inside the filter 1, i.e., in the space bounded by the bottom wall 11 and the arms 20. The filter membrane 25 is pressed against the arms 20 up to their upper edge 22 and against the bottom wall 11. The filter membrane 25 can be removed. This allows it to be removed for cleaning. The filter membrane 25 can be attached to the upper edge 22 of each arm 20. For example, it can be fixed by means of an elastic ring extending into the peripheral groove 23. The filter membrane 25 also defines a size of the filter 1.

The filter membrane 25 is a complementary wall, which together with the arms 20 form the side wall 14 of the filter 1. In this embodiment, the arms 20 have a supporting function, while the filter membrane 25, which is supported by the arms, has a filtering function. In this example, the filter membrane 25 is flexible, so that it can adapt to the shape of the bottom wall 11 and the arms 20. It can then adapt to a variation in the inclination of the arms 20 in relation to the longitudinal axis Z, described below.

In FIG. 1B, an adjustment means 26 has also been shown, allowing the size of the filter 1 to be adjusted. The adjustment means 26 has a wire 27, extending into the peripheral groove 23, that can slide into the peripheral groove 23. The wire 27 engages in a holding element 28, which holds the wire 27. A user can grab the holding element 28 and move the filter body away from the holding element 28. This reduces the length of wire 27 that is engaged in the peripheral groove 23. This makes it possible to adjust the size of the filter 1, as further described in connection with FIG. 1C. For example, the holding element 28 can be a sleeve. It is thus easily accessible and can be handled by a user.

As shown in FIG. 1C, each arm 20 forms an angle of inclination α with respect to the longitudinal axis Z. The inclination of each arm 20 is such that each arm 20 gradually deviates from the longitudinal axis Z from the lower edge 21 to the upper edge 22. The angle of inclination α is adjustable for each arm 20 and can vary from 0° to 450 or even 0° to 60 or more. When the angle of inclination is 0°, the arm 20 is parallel to the longitudinal Z axis.

Whatever the embodiment, the filter 1 is such that at rest, i.e., without stress on the arms 20, the arms 20 extend at an at rest angle $α_0$ with respect to the longitudinal axis Z. The at rest angle $α_0$ is, for example, between 20° or 30° and 60° or more. Each arm 20 can be deformable, allowing the inclination α to be adjusted and, in particular, reduced. Alternatively, each arm 20 can be rigid, with inclination adjustment being carried out at the lower edge 21. The lower edge 21 of each arm 20 is then arranged to allow the arm 20 to rotate about an axis of rotation in the XY radial plane. The rotation of the arm 20 allows the arm 20 to move toward or away from the longitudinal axis Z. In the absence of stress, the arms 20 tend to move closer to their rest position due to the elasticity of the arms 20 or the junction between the arms 20 and the bottom wall 11. In the rest position, the angle of inclination α of the arms 20 in relation to the longitudinal axis Z corresponds to the at rest angle $α_0$. In other words, when the inclination of the arms 20 is changed in relation to the angle of inclination at rest by applying a stress to the arms 20, the deformation of the arms 20, in relation to their position at rest, is elastic. When the stress stops, the arms 20 tend to incline at the angle of inclination at rest $α_0$.

The arms 20 extend around the longitudinal axis Z. Their lower edge 21 is arranged at the periphery of the bottom wall 11, or at a distance of less than 2 cm or 3 cm from the periphery.

As shown in FIG. 1C, the inclination of the arms 20 can be used to change the diameter D of the filter 1. Filter diameter is the maximum diameter of the filter 1. In the examples shown, the filter diameter corresponds to the diameter of the annular upper end 12. The greater the angle of inclination $\alpha$, the larger the filter diameter D. The diameter adjustment, by adjusting the inclination of the arms 20, makes it possible to adjust the diameter D of the filter 1 in relation to a diameter D' of the inlet duct 2.

Where the upper end 12 is not circular, the diameter of the upper end 12, corresponds to a diameter of a circle in which it is inscribed.

In its rest position, the filter 1 has a larger diameter D than the diameter D' of the inlet duct 2. By adjusting the inclination of the arms 20, by tightening the wire 27, the diameter D of the filter 1 is reduced, allowing the filter 1 to be inserted in the inlet duct 2. After the filter 1 has been inserted into the inlet duct 2, the stress exerted by the wire 27 on the arms 20 is released. The arms 20 then tend to move away from the longitudinal axis Z towards their resting inclination. They thus rest against the inner wall of the inlet duct 2. This allows the filter 1 to be held in place. The diameter D of the filter 1 then corresponds to the diameter D' of the inlet duct 2.

The filter 1 can also have legs 30, connected to the bottom wall 11. The bottom wall 11 is located between each leg 30 and the arms 20. Each leg 30 allows the bottom wall 11 to rest on a support 3 inside the inlet duct 2. For example, the support 3 can be a shoulder in the inlet duct 2, reducing the diameter D' of the inlet duct 2. Preferably, each leg 30 is a plate oriented parallel to the longitudinal axis Z. In the examples shown in FIGS. 1C, 2 and 3C, the legs 30 take the form of six plates oriented parallel to the longitudinal axis Z, converging toward the latter, being angularly offset from each other by 60°. The legs 30 allow the bottom wall 11 to be raised relative to the support 3, thus promoting the flow of water between the bottom wall 11 and the support 3.

The height of the legs 30, parallel to the longitudinal axis Z, can, for example, be between 1 cm and 10 cm. The height of the arms 20, parallel to the longitudinal axis Z, can, for example, be between 5 cm and 30 cm. The maximum diameter D of the filter 1, in the radial plane XY, can be, for example, between 10 cm and 30 cm. These dimensions can be applied, individually or in combination, in any embodiment.

Figure 2:
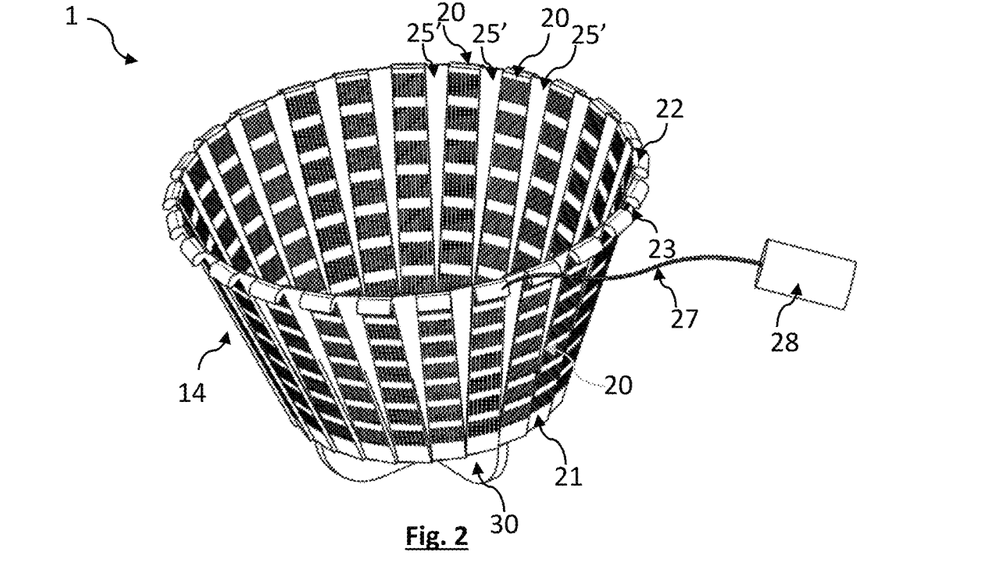
FIG. 2 illustrates a second embodiment of the present disclosure.

A second embodiment, in which the filter 1 has arms 20 forming part of the side wall 14 of the filter 1, is shown in FIG. 2. As previously described, the arms 20 extend between the lower edge 21, connected to the bottom wall 11, and the upper edge 22. Each arm 20 is configured such that the upper edge 22 is capable of being moved towards or away from the longitudinal axis Z. The arms 20 are provided with orifices, allowing water to pass through and filter elements to be retained. The same applies to the bottom wall 11 forming the bottom of the filter 1. Between each arm 20 there is a complementary wall 25. In the example shown in FIG. 2, the complementary wall 25 is solid. It is flexible, so that it can conform to a variation in the distance of the arms 20 from the longitudinal axis Z. The arms 20 are made of a rigid material. However, as in the first embodiment, the lower edge of each arm 20 allows a rotational movement of each arm 20 so that it can move away from or towards the longitudinal axis Z. In this example, the complementary wall 25 consists of elementary sections 25' separated from each other, each elementary section 25' extending between two adjacent arms 20.

As an alternative, the complementary wall 25 can be provided with orifices, arranged at each elementary section 25'. Each elementary section 25' then acts as a filtering membrane. As in the first embodiment, the filter 1 has a means of adjusting the filter size (the adjustment means 26), formed by the 27 and the holding element 28. The wire 27 is configured to slide into the peripheral groove 23, formed at the upper edge 22 of each arm 20.

Figure 3A:
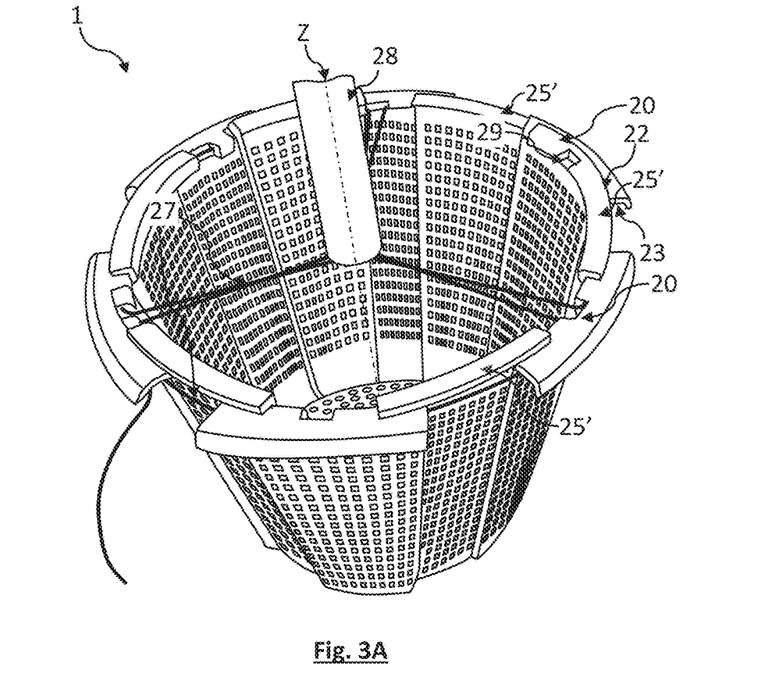
FIGS. 3A, 3B and 3C represent a third embodiment of the present disclosure.
Figure 3B:
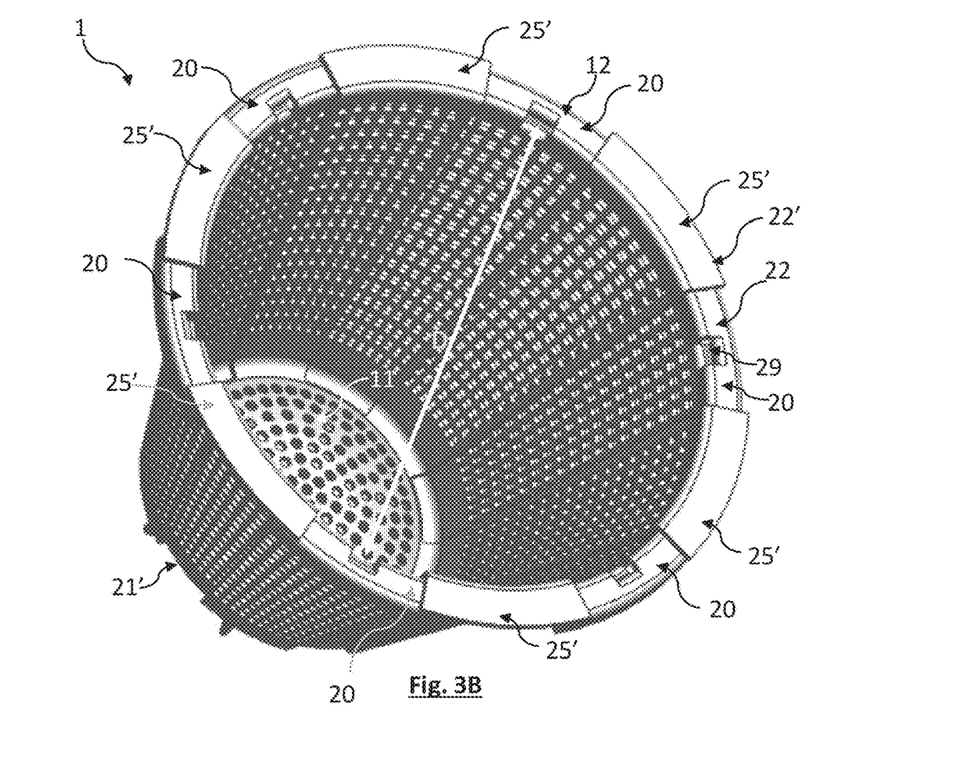
Figure 3C:
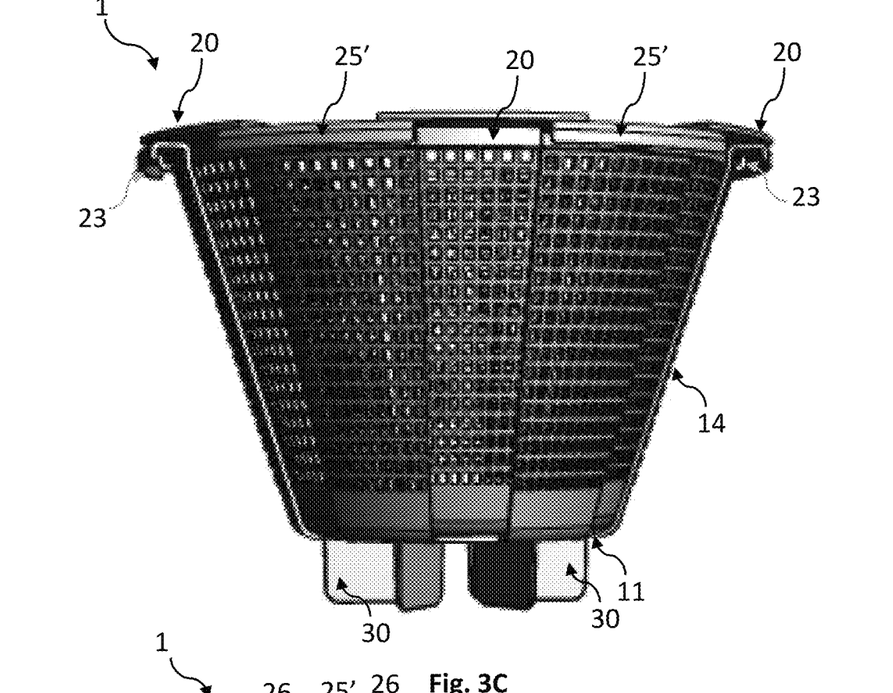

FIGS. 3A to 3C represent a third embodiment of the present disclosure, according to which the filter 1 has a side wall (the side wall 14) formed by rigid arms 20. As previously described, the arms 20 extend between the lower edge 21, connected to the bottom wall 11, and the upper edge 22. The side wall 14 is also formed by the complementary wall 25, the latter comprising elementary sections 25' separated from each other. Each elementary section 25' extends between two adjacent arms 20. Each elementary section 25' is connected to the bottom wall 11, and has an upper edge 22', capable of moving away from or towards the longitudinal axis Z.

In this third embodiment, the arms 20 and the elementary sections 25' are rigid. As can be seen in FIG. 3A, each elementary section 25' is partially superimposed on the two adjacent arms 20 to which it is connected. The portion of the elemental section superimposed on an arm (of arms 20) varies depending on the distance of the arm 20 from the longitudinal axis Z. The closer the upper edge 22 of the arm 20 comes to the longitudinal axis Z, the more the part of the elementary section 25' superimposed on the arm 20 increases.

The filter has the adjustment means 26 for spreading or tightening the arms 20. The adjustment means 26 has the wire 27, passing through a slot 29 in at least one arm 20. FIG. 3A shows the wire 27 connected to the arm 20. The wire 27 passes through the respective slots 29 in three arms 20, and engages into the peripheral groove 23. An operator can grab the sleeve (holding element 28), so that the arms 20 are tightened. As described in connection with the first embodiment, when the operator releases the sleeve (holding element 28), the arms 20 move apart to their rest position.

Alternatively, the adjustment means 26 may be similar to that described in relation to the first and second embodiments.

In the example shown in FIG. 3A, the arms 20 and the elementary sections 25' have orifices for water filtration. Depending on the variant, the arms 20 or elementary sections 25' can be solid.

The alternating arrangement of the arms 20 and the elementary sections 25' can be seen in FIG. 3B. FIG. 3B also shows the bottom wall 11, which has orifices through which the water to be filtered can flow.

FIG. 3C is a side view of the filter 1 shown in FIGS. 3A and 3B. As in the previous embodiments, the filter 1 has legs 30, extending from the bottom wall 11, parallel to the longitudinal axis Z.

The filter 1 as previously described can be inserted into the inlet duct 2 of a filtration system. Preferably, the longitudinal axis Z of the filter 1 is then merged with the inlet axis Z' (FIG. 1C) of the inlet duct 2. The bottom wall 11 is inserted beforehand at the upper end 12. The bottom wall 11 is thus arranged at a lower level, with respect to the vertical, than the upper end 12.

The adjustment of the filter diameter D, i.e., the adjustment of the diameter of the upper end 12, is carried out before the filter 1 is inserted. To do this, the arms 20 are stressed so as to reduce their inclination with respect to the longitudinal axis Z. This results in a reduction of the diameter D of the filter 1. Once the diameter D of the filter 1 gets smaller than the diameter D' of the inlet duct 2, the filter 1 is inserted into the inlet duct 2. After the filter 1 has been inserted, the stress on the arms 20 is released. The arms 20 tend to return to their inclination at rest, away from the longitudinal axis Z. They then rest against the inner wall of the inlet duct 2. The pressure of the arms 20 against the wall causes the diameter D of the filter 1 to reach the diameter D' of the inlet duct 2. Thus, the water flowing through inlet duct 2 flows through opening 13, so that it is filtered by the filter 1.

Figure 4A:
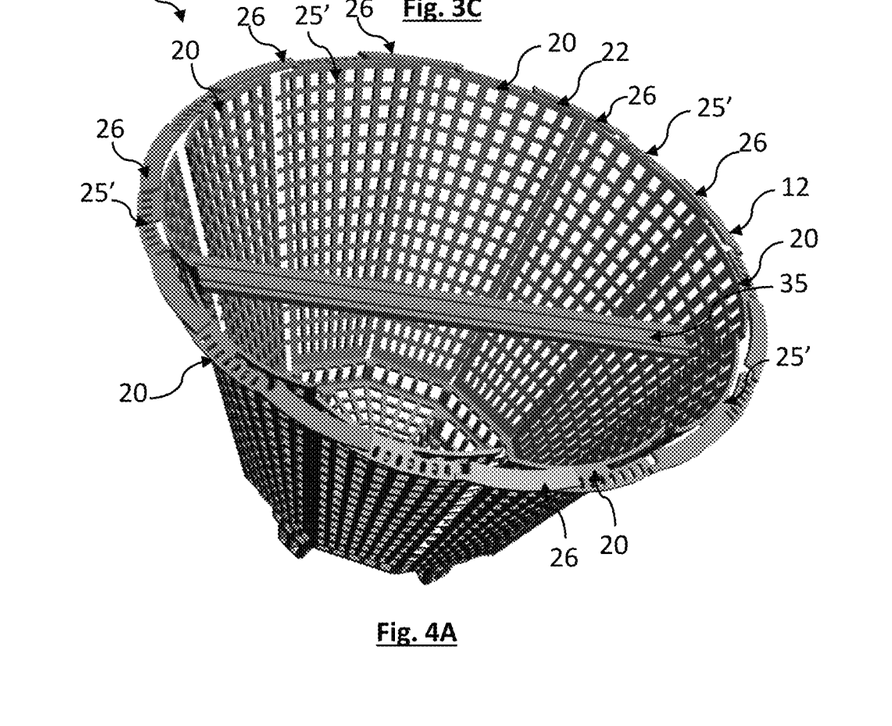
FIGS. 4A, 4B and 4C represent a fourth embodiment of the present disclosure.
Figure 4B:
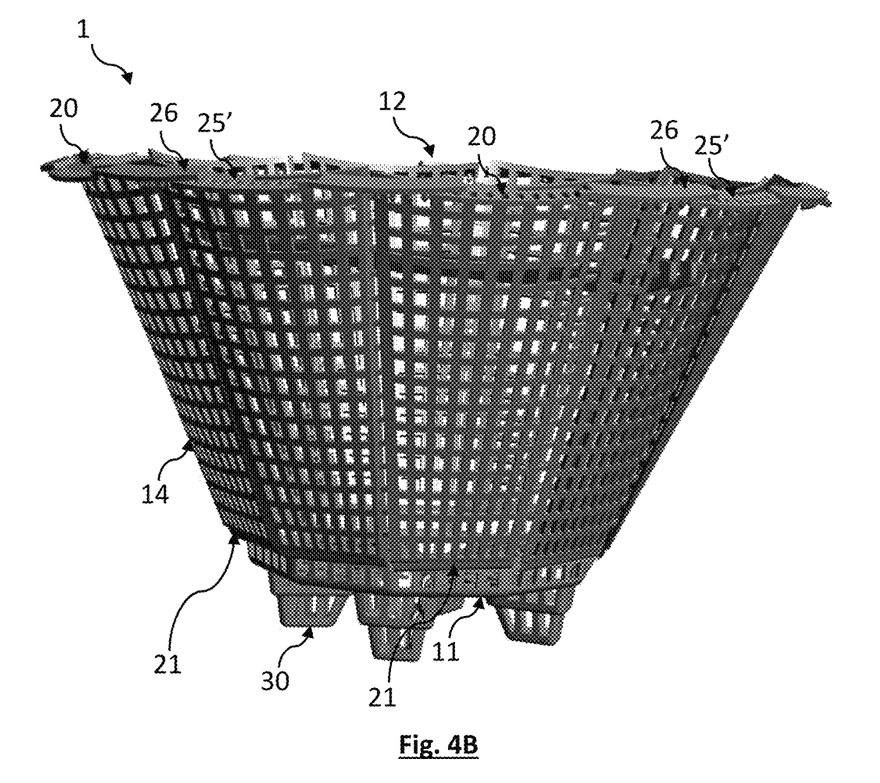
Figure 4C:
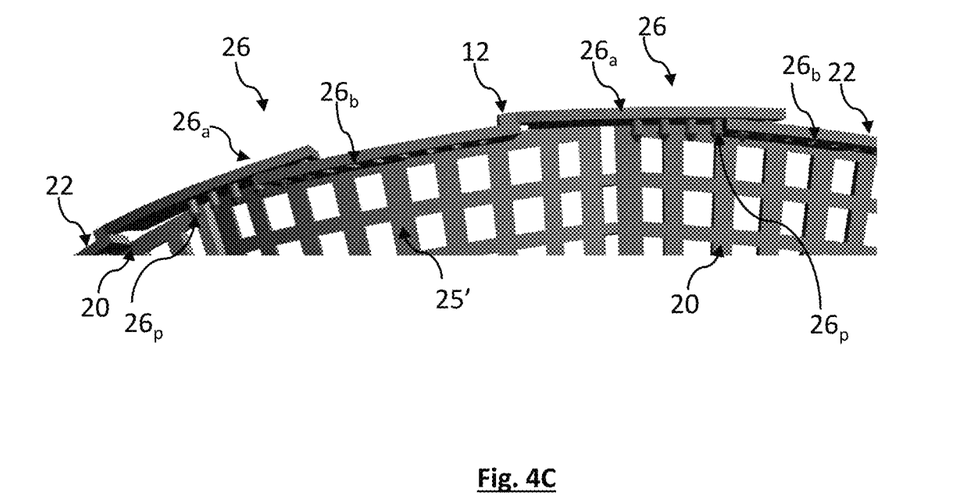

FIGS. 4A to 4C represent an alternative embodiment, similar to that shown in FIGS. 3A to 3C. The filter 1 has a side wall (side wall 14) formed by rigid arms 20. As shown in FIG. 4B, the arms 20 extend between their respective lower edges 21, located near the bottom wall 11, and their respective upper edges 22, forming the upper end 12 of the filter 1. The side wall 14 is also formed by the complementary wall 25, in the form of flexible or rigid elementary sections 25', separated from each other, having the same appearance and function as the arms 20. The arms 20 and the elementary sections 25' adjacent to them overlap, so as to ensure continuity of filtration along the side wall 14. Thus, each elementary section 25' can partially overlap at least one adjacent arm 20. Conversely, each arm 20 may overlap, at least partially, with an elementary section (of the elementary sections 25') adjacent thereto.

In FIG. 4B, it can be seen that the legs 30, the arms 20, the bottom wall 11, and the elementary sections 25' are openwork.

According to this embodiment, the upper edges 22 of the arms 20 and those of the additional elementary sections 25' form the upper end 12 of the filter 1, the latter being annular in shape. It defines the diameter of the filter 1.

At the upper end 12, the filter 1 has the adjustment means 26 for adjusting the filter size. According to this embodiment, as shown in FIG. 4C, the adjustment means 26 comprises, at each arm 20, a tab $26_a$, connected to the arm 20 and extending from the upper edge 22 of the arm 20, parallel to the upper edge, towards the elementary section 25' adjacent thereto. The tab $26_a$ has pins $26_p$, which can engage in openings $26_b$ at the upper edge 22 of the adjacent elementary section 25'. In the same way, the filter 1 has, at each elementary section 25', the tab $26_a$, connected to the elementary section 25', and extending from the upper edge 22 of the latter, parallel to the upper edge 22, in the direction of the arm 20 adjacent to it. The tab $26_a$ has pins $26_p$, which can engage in the openings $26_b$ in the upper edge 22 of the adjacent arm 20. This adjustment means 26 allows simple and precise adjustment of the diameter D defined by the upper end 12 of the filter 1.

The filter 1 also has a holding handle 35 extending between two arms 20 or between two elementary sections 25' or between one arm 20 and one elementary section 25', preferably diametrically opposed. The holding handle 35 can be flexible or rigid. The fact that the holding handle 35 is flexible makes it possible to conform to different diameters of the filter 1: the holding handle 35 can then have a variable radius of curvature depending on the diameter of the filter 1. It can be inserted into orifices in the side wall 14, at the level of an arm (of the arms 20) or an elementary section (of the elementary sections 25'). Such a handle (the holding handle 35) can be used for all the previously described embodiments.

The invention claimed is:

1. A filter, dimensioned for insertion into an inlet duct of a water filtration system, the inlet duct extending around an inlet axis, the inlet duct defining an inlet diameter, the inlet duct being positioned to collect water to be filtered, the filter comprising:
    an annular upper end of the filter, delimiting an opening around a longitudinal axis of the filter, so as to allow an admission of water into the filter, the annular upper end defining a filter diameter;
    a bottom wall, forming a bottom of the filter, extending opposite the opening; and
    a side wall, extending between the annular upper end of the filter and the bottom wall, around the longitudinal axis;
    the side wall and/or the bottom wall having orifices, so as to allow water to flow through the orifices and to retain solid elements, the size of which is greater than a filtration size, defined by the orifices;
    wherein the side wall comprises:
        a plurality of arms, each arm extending between a lower edge of the arm and an upper edge of the arm, the lower edge of the arm being connected to the bottom wall, the upper edges of the arms of the plurality of arms forming the annular upper end of the filter;
        each arm extending from the bottom wall towards the annular upper end, away from the longitudinal axis, each arm extending along an inclination, the inclination between each arm and the longitudinal axis being adjustable, so that the filter diameter of the annular upper end is variable according to the inclination of each arm;
    so that when the filter is inserted into the inlet duct, the longitudinal axis being parallel to the inlet axis, the inclination of the arms is adjusted so that the filter diameter of the annular upper end is adapted to the inlet diameter.

2. The filter of claim 1, further comprising a complementary wall extending between each arm.

3. The filter of claim 2, wherein the complementary wall comprises elementary sections, each elementary section extending between two adjacent arms and being connected thereto.

4. The filter of claim 3, wherein at least one elementary section has orifices, so as to allow the flow of water therethrough.

5. The filter of claim 3, wherein at least one elementary section, and an arm to which the elementary section is connected, partially overlap.

6. The filter of claim 2, wherein the complementary wall is formed by a filter membrane, extending against the bottom wall and against each arm.

7. The filter of claim 1, wherein each arm, in the absence of stress on the arm, extends at an angle of inclination at rest with respect to the longitudinal axis.

8. The filter of claim 1, wherein the bottom wall has a diameter, perpendicular to the longitudinal axis, strictly less than the diameter of the annular upper end.

9. The filter of claim 1, wherein an angle of inclination at which each of at least two arms extends relative to the longitudinal axis is adjustable.

10. The filter of claim 9, further comprising a wire connected to the at least two arms and actuatable to selectively move the at least two arms towards or away from the longitudinal axis.

11. The filter of claim 10, wherein the upper edge of at least two arms has a groove, so that the wire can slide into the groove.

12. The filter of claim 1, further comprising at least one leg, connected to and extending from the bottom wall, the leg being positioned and dimensioned to rest within the inlet duct when the filter is inserted in the inlet duct.

13. A method for inserting a filter, according to claim 1, into an inlet duct of a filtration system, the inlet duct extending around an inlet axis, according to an inlet diameter, the method comprising:
- adjusting the diameter of the filter by exerting a stress on arms of the filter, so as to bring the latter closer to the longitudinal axis of the filter, so as to obtain the filter diameter of the annular upper end smaller than the inlet diameter;
- inserting the filter into the inlet duct, the longitudinal axis of the filter being coincident with the inlet axis, so that after insertion, the bottom wall is disposed at a lower level, relative to the vertical, than the annular upper end; and
- after the insertion of the filter, releasing the arms so that the arms incline with respect to the longitudinal axis, towards the inlet duct, until the arms rest against the inlet duct.

* * * * *

UNITED STATES PATENT AND TRADEMARK OFFICE
CERTIFICATE OF CORRECTION

PATENT NO. : 11,524,252 B2
APPLICATION NO. : 16/966860
DATED : December 13, 2022
INVENTOR(S) : Yann Aquilina and Matthieu Bouvier It is certified that error appears in the above-identified patent and that said Letters Patent is hereby corrected as shown below:

In the Specification

| | | |
|---|---|---|
| Column 2, | Line 21, | change "between 20" to --between 20°-- |
| Column 4, | Line 43, | change "to 450" to --to 45°-- |
| Column 4, | Line 44, | change "60 or" to --60° or-- |
| Column 6, | Line 55, | change "is aside" to --is a side-- |

Signed and Sealed this
Tenth Day of October, 2023

Katherine Kelly Vidal
*Director of the United States Patent and Trademark Office*